Nov. 15, 1960     A. F. AMELIO     2,960,167
ENGINE CONTROL

Filed Feb. 14, 1957     2 Sheets-Sheet 1

INVENTOR
ARMAND F. AMELIO
BY Jack N. McCarthy
AGENT

Nov. 15, 1960 A. F. AMELIO 2,960,167
ENGINE CONTROL
Filed Feb. 14, 1957 2 Sheets-Sheet 2
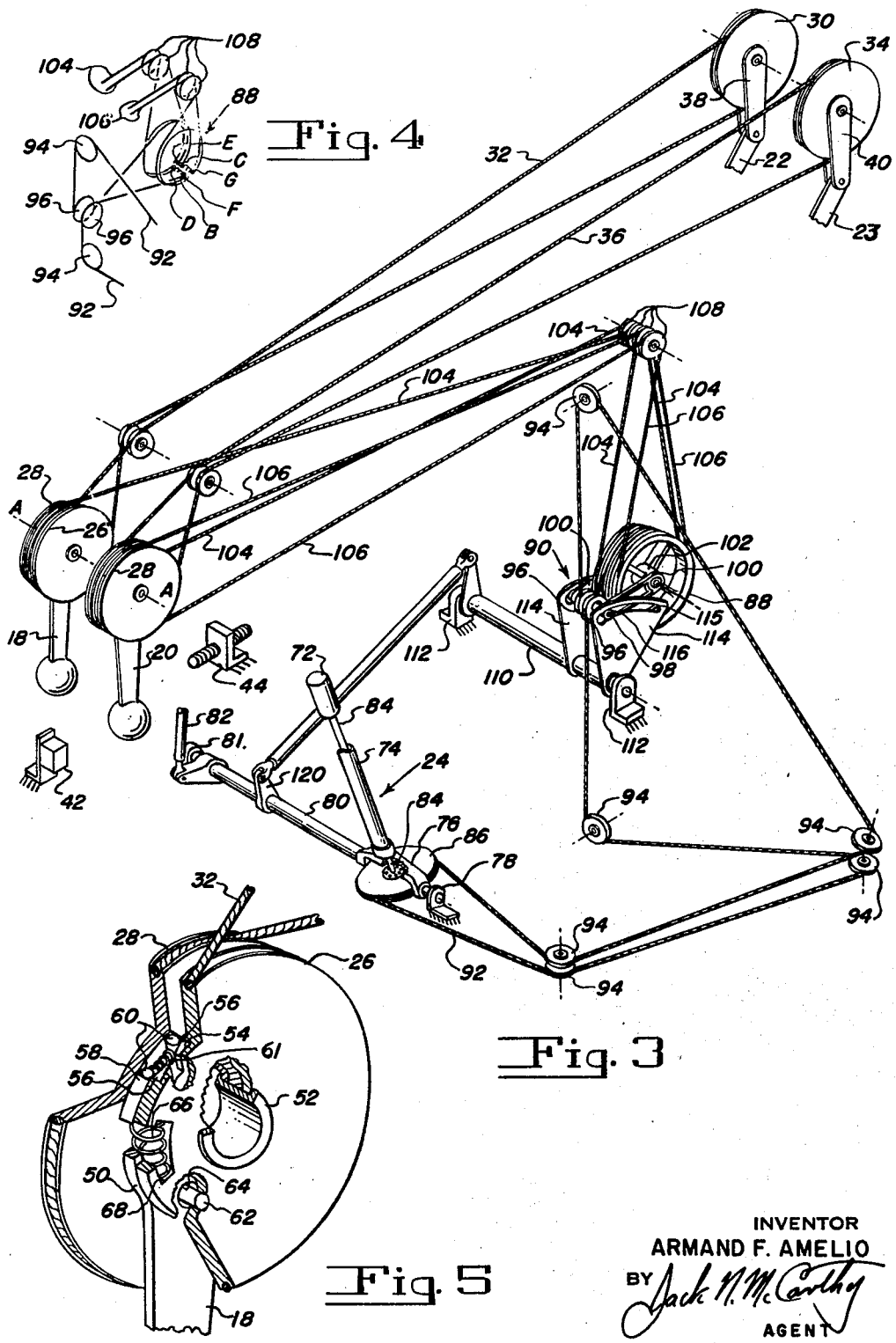
INVENTOR
ARMAND F. AMELIO
BY Jack N. McCarthy
AGENT United States Patent Office 2,960,167
Patented Nov. 15, 1960

2,960,167

ENGINE CONTROL

Armand F. Amelio, New York, N.Y., assignor to United Aircraft Corporation, East Hartford, Conn., a corporation of Delaware Filed Feb. 14, 1957, Ser. No. 640,270

18 Claims. (Cl. 170—135.74)

This invention relates to an engine control system for a rotary wing aircraft and more particularly to helicopters of the multiengine type.

An object of this invention is to provide an engine control system which includes a pilot operated means designed so as to have complete individual control of each of the engines.

Another object of this invention is to provide an engine control system having a pilot operated control on the helicopter for operating all of the engines together.

A further object of this invention is to provide an engine control system having means which automatically operates all of the engines together with a change in collective pitch.

Another object of this invention is to provide an engine control system in which the automatic means for operating the engines controls the power on a predetermined schedule.

A further object of this invention is to provide an engine control system in which the individual control of any of the engines can be locked in any position while permitting the pilot operated control for operation of the engines together and the means for automatically operating all of the engines with a change in collective pitch to control the remaining engine or engines.

These and other objects and advantages of the invention will be pointed out in connection with the following detailed description of the drawings in which one embodiment of the invention is illustrated.

In these drawings:

Fig. 3 is an enlarged view of the engine control system using a minimum number of pulleys and guide members.

Fig. 4 is a diagrammatic showing of the mixing unit and adjacent pulleys showing how the cables of the system are attached to the mixing unit.

Fig. 5 is an enlarged view of one of the pilot operated power levers partly in section.

Figure 1:
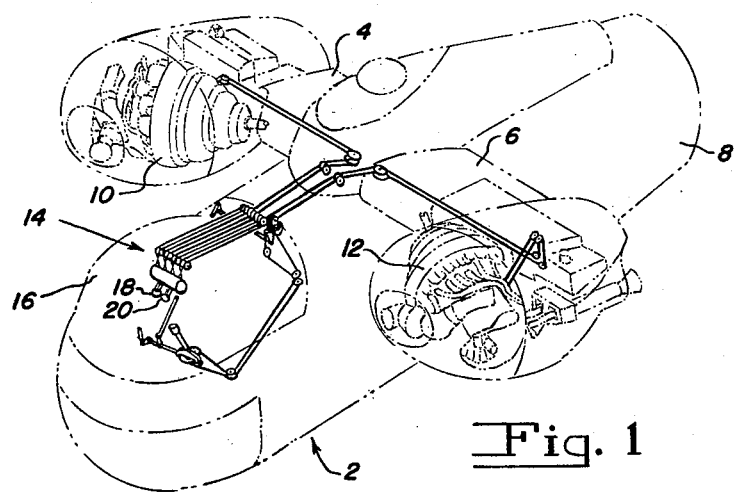
Fig. 1 is a perspective view of a portion of a helicopter in phantom showing the location of the engine control system.

Referring to Fig. 1, the helicopter 2 represented here is shown and described in the patent to Gluhareff, United States Patent No. 2,755,038 filed October 21, 1952 for a Helicopter-Airplane with Engines Mounted on Fixed Wings. Wings 4 and 6 extend from each side of the fuselage 8 to support engines 10 and 12 respectively. While piston engines are shown, any type engine can be used. The engine control system 14 has its pilot operated portion located in the pilot's compartment 16 with a system of pulleys, links and cables connecting it to the engines. The regular helicopter operating controls can be any type having a collective pitch actuating member. Such controls are shown in United States application Serial No. 372,265 to Walter Gerstenberger for Gyro Stabilizer for Helicopter filed August 4, 1953, now abandoned and United States application Serial No. 570,736 to Walter Gerstenberger for Hydraulic Booster Control filed March 12, 1956.

The engine control system has three separate means for controlling the power output of the engine. These are (1) a manual power lever means for each engine of the aircraft which is designed so as to obtain complete independent authority of each of the engines, (2) a pilot operated means for controlling all of the engines simultaneously, and (3) a means connected with the collective pitch lever 24 for automatically operating all of the engines together with a change in collective pitch.

Figure 2:
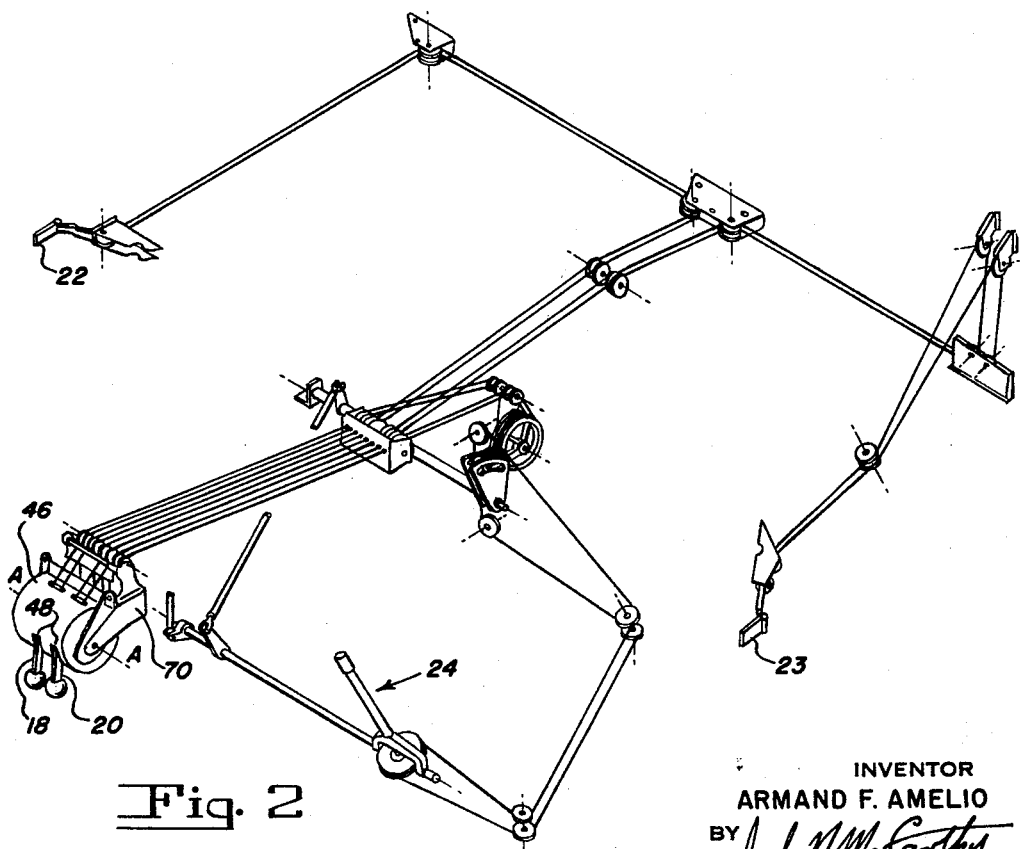
Fig. 2 is an enlarged view of the engine control system as shown in Fig. 1.

In Figs. 1, 2 and 3, two power levers 18 and 20 have been shown connected to engines 10 and 12, respectively, or members 22 and 23, respectively, which are the connecting means to the power operated mechanism moved by the engine control system.

Each power lever means has its lever connected to an output pulley 26 and an input pulley 28. Shown in Fig. 5 is an enlargement of the connection between input and output pulleys 28 and 26, respectively, in relation to the right-hand power lever 18. An identical mechanism interconnects the input and output pulleys of the left-hand power lever 20.

Each of the pulleys 26 and 28 and the annular end 50 of the power lever 18 are mounted for rotation on an annular ferrule 52 about an axis A—A. The inner face of pulley 26 contains an arcuate recess 54 which contains a wedge shaped cam 56 in each end. Each wedge shaped cam tapers upwardly toward the end of the recess in which it is located. The annular portion 50 of lever 18 overlies a portion of the inner face of pulleys 26 and has an arcuate notch 58 cut therethrough which overlies the recess formed in the inner face of pulley 26. Notch 58 is slightly shorter in length than the recess 54. A roller 60 is positioned in each end of the notch 58. Each roller has contact with the cam 56 located in the recess in the face of pulley 26. A spring 61 located between said rollers 60 biases them toward the ends of the arcuate notch 58.

The inner face of pulley 28 forms a flat surface and merely moves against the opposing face of the annular portion 50 of lever 18. However, this surface of pulley 28 contacts the rollers 60, referred to above, and when said pulley is rotated, it in turn rotates pulley 26 in either direction through a clutching action also turning lever 18. However, when lever 18 is held stationary after a slight movement of pulley 28, one end of notch 58 moves the roller which is being acted on down the slope of its respective cam thereby permitting the pulley 28 to rotate without transmitting its motion to pulley 26 or lever 18.

Power lever 18 is permitted the necessary amount of lost motion to provide the motive force necessary to dislodge the engaging rollers by means of a pin 62 fixed to the inner face of pulley 26 which projects into a large size hole 64. The hole is oversized to the extent that it permits about a 1½° movement in each direction. The lost motion is divided equally in each direction by a centering spring 66 which is located within two slots 68 which are formed in pulley 26 and the annular portion 50 of lever 18.

The action of the clutch provides an irreversible mechanism. The throttle lever is locked into the control system throughout its total range unless the throttle lever action is resisted. In manual operation of lever 18 the force applied to the lever dislodges one of the rollers 60 and enables the lever to move in the desired direction moving only pulley 26.

Power lever 18 has its output pulley 26 connected to an operating pulley 30 by means of a cable 32 and a pulley and guide system. The intermediate pulleys and guides of the engine control system are placed on the aircraft so as to prevent the cable from coming into contact with other portions of the aircraft and to permit an efficient operation between the operating lever and the operating pulley of the engine. Power lever 20 has its output pulley 26 connected to an operating pulley 34 by means of a cable 36 and a pulley and guide system. Connected to pulley 30 and movable therewith is an arm 38 which has its outer end connected to the member 22 of the engine 10 which is considered the right-hand engine. Connected to pulley 34 and movable therewith is an arm 40 which has its outer end connected to the member 24 of the engine 12 which is considered the left-hand engine. Therefore, it can be seen that, as lever 18 or 20 is moved between its forward and rearward position, the movement of either lever is transferred through its respective output pulley 26 to actuate its respective operating pulley 30 or 34. Movement of output pulley 30 or 34 in turn moves lever arm 38 or 40, respectively, which positions engine member 22 or 23, respectively.

As shown in Fig. 1, the two levers are mounted at the forward end of the system in the center of the pilot's compartment 16. The pulleys 26 and 28 of the system are enclosed by a casing 46 provided with slots 48 for movement of the levers 18 and 20. Casing 46 and axis A—A are supported by bracket 70. A fixed stop is placed at the end of each slot 48 at the low power end of movement of each power lever, while an adjustable stop is placed at the other end of each slot 48 at the high power end. This will enable the distance through which the power lever travels to be set properly. These stops are represented in Fig. 3 by members 42 and 44. Power lever locks are provided to enable the pilot to lock either or both of the levers in a given position. A lock may consist of any device which fixedly positions a lever with respect to the helicopter. While no specific locking device has been shown, it could consist of an upstanding flange positioned along one side of a slot 48 having a plurality of holes from end to end, the holes of said flange being positioned so as to overlie a hole in a cooperating lever in a plurality of different positions. A pin extending through a hole in the lever and a corresponding hole in an adjacent or operating flange would fixedly position that lever.

The pilot operated means for controlling all of the engines simultaneously includes a twist grip 72 located on the collective pitch lever 24. The collective pitch lever consists of a hollow tube 74 having a bifurcated bracket 76 with tines extending downwardly from the tube 74. One tine is pivoted on bracket 78 while the other tine has an extension 80 pivoted in a bracket 81. An arm extending from the extension 80 is connected to a member 82 which in turn is connected to a regular helicopter operating system such as referred to above.

Twist grip 72 is fixedly connected to a shaft 84 which extends through the hollow tube 74 to a point between the tines of the bracket 76. A pulley 86 is mounted on shaft 84 between said tines with the axis of the pivotal movement of the collective pitch lever 24 passing through the center of the bracket 86 and, therefore, through the shaft 84. It can be seen that, as this grip 72 is rotated, pulley 86 is in turn actuated.

Pulley 86 is connected to an output drum pulley 88 of a mixing unit 90 which is constructed to receive two inputs. Drum pulley 88 is a pulley of such width so as to have four annular pulley grooves therearound. This input from the twist grip of the collective pitch lever is conveyed to the drum pulley 88 by means of a cable 92 and a system of pulleys 94 which are pivoted to the helicopter and pulleys 96 which are pivoted on a shaft 98 which is mounted between two arms 100 which are pivoted about the hub 102 of the drum pulley 88. One end of cable 92 extends over one pulley 96 and is attached at a point B to the drum pulley 88 located in one inner pulley groove. The other end of cable 92 extends under the other pulley 96 and is attached at a point C to the drum pulley 88 located in the other inner pulley groove. The intermediate pulleys of this connection are placed on the aircraft so as to prevent the cable from coming into contact with other portions of the aircraft and to permit an efficient operation between the twist grip and the drum pulley 88. The axis of the pulleys 96 is maintained in a fixed position for a given collective pitch lever position by a device to be hereinafter described.

The output drum pulley 88 of the mixing unit 90 has one of its outer pulley grooves connected to the input pulley 28 of power lever 18 by a cable 104 and its other outer pulley groove connected to the input pulley 28 of power lever 20 by a cable 106. Cables 104 and 106 extend over pulleys 108 mounted for individual movement on an axis fixed in relation to the helicopters. One end of cable 104 extends over one pulley 108 to one side of one outer pulley groove and is attached to a point D thereon. The other end of cable 104 extends over another pulley 108 to the other side of the same outer pulley groove and is attached to a point E adjacent point D. One end of cable 106 extends over another pulley 108 to one side of the other outer pulley groove and is attached to a point F thereon. The other end of cable 106 extends over another pulley 108 to the other side of this outer pulley groove and is attached to a point G adjacent point F. It can be seen that any rotation of drum pulley 88 will be transmitted in a like manner to both input pulleys 28. This movement of the input pulleys 28 will, if the power levers 18 and 20 are free to move, move the output pulleys 26 and reposition levers 18 and 20 and which in turn move operating pulleys 30 and 34 a like amount, thereby moving members 22 and 23 an equal amount. Since members 23 and 24 in turn move a power controlling mechanism of the engine, both engines will be equally controlled. Members 23 and 24 can be connected to any power controlling device attached to its respective engine. In a piston engine this may be a throttle valve lever and in a turbine type engine this may be a fuel control lever.

The means for automatically operating all of the engines together with a change in collective pitch includes a direct linkage mechanism to move the axis of pulleys 96 about the axis of the drum pulley 88. This mechanism includes a shaft 110 mounted for rotation in brackets 112 fixed to the helicopter. This shaft has two arms 114 extending therefrom, one on each side of the two pulleys 96. The outer end of each arm 114 has a like cam groove 115 therein which engages a roller 116 on each end of shaft 98. It can be seen that, as the cam along its length varies its distance from the axis of the shaft 110, movement of the arms 114 moves shaft 98 about the axis of drum pulley 88 on arms 100. When a change in collective pitch is desired, the collective pitch lever 24 is moved either forwardly or rearwardly, and this motion is transferred to arms 114 through shaft 110 by a link 118 which connects the outer end of an arm 120 extending from extension 80 to the outer end of an arm 122 which extends from shaft 110. As pulleys 96 are moved downwardly or upwardly on arms 100 around the drum pulley 88, the drum pulley 88 is rotated permitting the pulleys 96 to either approach or go away from the pulley 94 located above the pulleys 96 and the pulley 94 located below the pulleys 96 respectively. Here again the rotation of drum pulley 88 is transmitted to the engine in the same manner as previously described.

The cam grooves 115 are formed on a curve so as to obtain a desired engine power setting for each specific collective pitch lever setting.

The pilot operated means for controlling all of the engines simultaneously, which means includes the twist grip, is designed so as not to be affected by collective lever movement. It is to be understood that hydraulic actuators may be incorporated into the structure wherever necessary to provide ease of operation.

*Operation*

In engine starting, the manual power levers 18 and 20 are generally used. During flight the power levers 18 and 20 are normally used for engine synchronization or for single engine operation. After synchronization, the two engines are controlled simultaneously by the twist grip on the collective pitch lever. The engine controls are synchronized with the operation of the collective pitch lever so that increasing collective pitch automatically increases a proper amount of engine power and decreasing collective pitch decreases a proper amount of engine power. As stated hereinbefore, the amount of power increase or decrease is controlled by the shape of the cam groove 115. If operation is required by one engine and one power lever is fixed in a closed or low power position, movement of either the twist grip or collective pitch lever will act on the remaining engine in the same manner as if both engines were running. However, the drum pulley 88 will merely rotate the input pulley of the locked power lever through the action of the clutch mechanism located in that power lever means.

While one embodiment has been hereinabove described and illustrated in the accompanying drawings for the purpose of disclosing the invention, it is to be undesrtood that the invention is not limited to the particular embodiment, so illustrated and described, but that such changes in the size, shape and arrangement of the various parts may be resorted to as coming within the scope of the adjoining claims.

I claim:

1. In a helicopter, two or more engines, a rotor head with blades, means operatively connected to said rotor for driving said rotor head by said engines, means operatively connected to said blades for changing the collective pitch of said blades including a collective pitch lever, said collective pitch lever comprising a hollow tube with a shaft rotatable therein, a twist grip fixed to said shaft, a pulley wheel fixed to said shaft, means operatively connected to said helicopter for mounting said lever for pivotal movement about an axis which passes through said shaft and lies in the plane of said pulley wheel, means operatively connected to said engines for controlling said engines simultaneously, said pulley wheel being operatively connected to said last named means, and means operatively connected to said collective pitch lever for automatically actuating said means for controlling said engines simultaneously with a change in collective pitch.

2. In a helicopter, two or more engines, a rotor head with blades, means operatively connected to said rotor for driving said rotor head by said engines, means operatively connected to said blades for changing the collective pitch of said blades including a collective pitch lever, said collective pitch lever comprising a hollow tube with a shaft rotatable therein, a twist grip fixed to said shaft, a pulley wheel fixed to said shaft, means operatively connected to said helicopter for mounting said lever for pivotal movement about an axis which passes through said shaft and lies in the plane of said pulley wheel, means operatively connected to said engines for controlling said engines simultaneously, said pulley wheel being operatively connected to said last named means, and means operatively connected to said collective pitch lever for automatically actuating said means for controlling said engine simultaneously in accordance with a predetermined schedule with a change in collective pitch.

3. In a rotary wing aircraft having a plurality of engines, a rotor head with blades, and means operatively connected to said blades for changing the collective pitch of said blades, first pilot operated means operatively connected to said engines for controlling each of said engines separately, second pilot operated means operatively connected to said engines for controlling said engines simultaneously, and means operatively connected to said first pilot operated means for automatically actuating said engines for controlling said engines simultaneously with a change in collective pitch.

4. In a rotary wing aircraft having a plurality of engines, a rotor head with blades, and means operatively connected to said blades for changing the collective pitch of said blades, first pilot operated means operatively connected to said engines for controlling each of said engines separately, second pilot operated means operatively connected to said first pilot operated means for controlling said engines simultaneously, and means operatively connected to said first pilot operated means and to said means for changing the collective pitch of said blades for automatically controlling said engines simultaneously with a change in collective pitch.

5. In a rotary wing aircraft having two or more engines, a rotor head with blades mounted thereon, means operatively connected to said blades for changing the collective pitch of said blades, first pilot operated means operatively connected to said engines for controlling each of said engines separately, second pilot operated means operatively connected to said engines for controlling said engines simultaneously, and means operatively connected to said engines for automatically controlling said engines simultaneously with a change in collective pitch, said last named means including an arm movable with said means for changing pitch, said arm having a cam thereon, a follower positioned in said cam, said follower being operatively connected to all of said engines.

6. In a rotary wing aircraft having a plurality of engines, a rotor head with blades, means operatively connected to said blades for changing the collective pitch of said blades, first pilot operated means operatively connected to said engines for controlling each of said engines separately, second pilot operated means operatively connected to said engines for controlling said engines simultaneously and means operatively connected to said engines for automatically controlling said engines simultaneously with a change in collective pitch, said first pilot operated means for a power lever for each engine and means connecting each of said power levers to its respective engine, said automatic means including an arm movable with said means for changing pitch, said arm having a cam thereon, a follower positioned in said cam, said follower being operatively connected to said power levers.

7. In a rotary wing aircraft with two or more engines, a rotor head with blades, means operatively connected to said blades for changing the collective pitch of said blades, first pilot operated means operatively connected to said engines for controlling each of said engines separately, said first pilot operated means having a power lever connected to each engine, second means operatively connected to said engines for controlling said engines simultaneously, third pilot operated means operatively connected to said second means for actuating said second means, and fourth means operatively connected to said second means for automatically actuating said second means for controlling said engines simultaneously with a change in collective pitch.

8. In a rotary wing aircraft with two or more engines, a rotor head with blades, means operatively connected to said blades for changing the collective pitch of said blades, first pilot operated means operatively connected to said engines for controlling each of said engines separately, said first pilot operated means having a power lever connected to each engine, second means operatively connected to said first pilot operated means for controlling said engines simultaneously, third pilot operated means operatively connected to said second means for actuating said second means, and fourth means operatively connected to said second means for automatically actuating said second means for controlling said engines simultaneously with a change in collective pitch.

9. In a rotary wing aircraft having a plurality of engines, a rotor head with blades, means operatively connected to said blades for changing the collective pitch of said blades, first pilot operated means for controlling each of said engines separately, said first pilot operated means having a power lever for each engine, second means operatively connected to said engines controlling said engines simultaneously including a mixing unit, said unit having two input means and one output means, said output means being operatively connected to said engines, third pilot operated means operatively connected to one of said input means for actuating said one input means, and fourth means operatively connected to said other of said input means for automatically actuating the other of said input means with a change in collective pitch.

10. In a rotary wing aircraft having a plurality of engines, a rotor head with blades, means operatively connected to said blades for changing the collective pitch of said blades, first pilot operated means for controlling each of said engines separately, said first pilot operated means having a power lever for each engine, second means operatively connected to said engines controlling said engines simultaneously including a mixing unit, said unit having two input means and one output means, said output means being operatively connected to said first pilot operated means, third pilot operated means operatively connected to one of said input means for actuating said one input means, and fourth means operatively connected to said other of said input means for automatically actuating the other of said input means with a change in collective pitch.

11. In a rotary wing aircraft having two or more engines, a rotor head with blades, means operatively connected to said blades for changing the collective pitch of said blades, first means operatively connected to said engines for controlling each of said engines separately, second pilot operated means operatively connected to said first means for actuating said first controlling means, said second pilot operated means having a power lever for each engine, third means including a rotatable drum pulley operatively connected to said first controlling means for controlling said engines simultaneously, fourth pilot operated means operatively connected to said pulley for rotating said pulley, and fifth means operatively connected to said pulley for automatically rotating said pulley with a change in collective pitch.

12. In a rotary wing aircraft having two or more engines, a rotor head with blades, means operatively connected to said blades for changing the collective pitch of said blades, first means operatively connected to said engines for controlling the power output of each of said engines separately, second pilot operated means operatively connected to said first means for actuating said first controlling means, said second pilot operated means having a power lever connected to each engine, third means including a rotatable drum pulley being operatively connected to said first controlling means for controlling the power output of said engines simultaneously, fourth pilot operated means operatively connected to said pulley for rotating said pulley, and fifth means operatively connected to said pulley for automatically rotating said pulley with a change in collective pitch, said fifth means including means operatively connected with said pulley for rotating said pulley in accordance with a predetermined schedule.

13. In a rotary wing aircraft having two or more engines, a rotor head with blades, means operatively connected to said blades for changing the collective pitch of said blades, first means operatively connected to said engines for controlling the power output of each of said engines separately, second pilot operated means operatively connected to said first means for actuating said first controlling means, said second pilot operated means having a power lever connected to each engine, third means including a rotatable drum pulley being operatively connected to said first controlling means for controlling the power output of said engines simultaneously, fourth pilot operated means operatively connected to said pulley for rotating said pulley, and fifth means operatively connected to said pulley for automatically rotating said pulley with a change in collective pitch, said fifth means including a cam operatively connected to said pulley which rotates said pulley in accordance with a predetermined schedule.

14. In a rotary wing aircraft having two or more engines, a rotor head with blades, means operatively connected to said blades for changing the collective pitch of said blades including a collective pitch lever, first pilot operated means operatively connected to said engines for controlling each of said engines separately, said first pilot operated means having a power lever operatively connected to each engine, second means operatively connected to said engines for controlling said engines simultaneously, third pilot operated means operatively connected to said second means for actuating said second means including an actuating member operatively connected to said collective pitch lever and fourth means operatively connected to said second means for automatically actuating said second means for controlling said engines simultaneously with a change in collective pitch including another actuating member connected to said collective pitch lever.

15. In a rotary wing aircraft having two or more engines, each engine having an engine controlling device operatively connected thereto, a rotor head with blades operatively connected to said aircraft, means operatively connected to said blades for changing the collective pitch of said blades, a separate power lever operatively connected to each controlling device of each engine for controlling each engine separately, means operatively connected to said controlling devices for actuating said controlling devices simultaneously including a mixing unit, said unit having two input means and one output means, said output means being operatively connected to said devices, pilot operated means operatively connected to one of said input means for actuating said input means, and means operatively connected to the other of said input means for automatically actuating the other of said input means with a change in collective pitch.

16. In a rotary wing aircraft having a plurality of engines, a rotor head with blades, and first means operatively connected to said blades for changing the collective pitch of said blades, second pilot operated means operatively connected to said engines for controlling each of said engines separately, third means operatively connected to said engines for controlling said engines simultaneously, fourth pilot operated means operatively connected to said third means for actuating said third means, and fifth means operatively connected to said third means and first means actuating said third means with a change in collective pitch.

17. In a rotary wing aircraft having a plurality of engines, a rotor head with blades, and first means operatively connected to said blades for changing the collective pitch of said blades, second pilot operated means operatively connected to said engines for controlling each of said engines separately, third means operatively connected to said second operated means for controlling said engines simultaneously, fourth pilot operated means operatively connected to said third means for actuating said third means, and fifth means operatively connected to said third means and first means for actuating said third means with a change in collective pitch.

18. In a rotary wing aircraft having a plurality of engines, a rotor head with blades, and first means operatively connected to said blades for changing the collective pitch of said blades, second pilot operated means operatively connected to said engines for controlling each of said engines separately, third means operatively connected to said second operated means for controlling said engines simultaneously, said third means including a rotatable drum, fourth pilot operated means operatively connected to said third means for rotating said drum, and fifth means operatively connected to said third means and first means for rotating said drum with a change in collective pitch.

References Cited in the file of this patent

UNITED STATES PATENTS

| | | |
|---|---|---|
| 2,608,104 | Feeney et al. | Aug. 26, 1952 |
| 2,613,751 | Donovan et al. | Oct. 14, 1952 |
| 2,664,958 | Dancik | Jan. 5, 1954 |
| 2,665,859 | Papadakos | Jan. 12, 1954 |
| 2,734,585 | Ball et al. | Feb. 14, 1956 |